United States Patent [19]

Wright

[11] Patent Number: 5,098,227

[45] Date of Patent: Mar. 24, 1992

[54] TUBULAR RETAINER FOR MINE ROOF EXPANSION ANCHOR AND METHOD OF USE

[75] Inventor: Raymond L. Wright, Syracuse, N.Y.

[73] Assignee: The Eastern Company, Naugatuck, Conn.

[21] Appl. No.: 663,247

[22] Filed: Mar. 1, 1991

[51] Int. Cl.⁵ .............................................. E21D 20/02
[52] U.S. Cl. ................................ 405/259.6; 405/259.5
[58] Field of Search ....................... 405/259, 260, 261; 411/45, 60, 62, 64, 65, 73

[56] References Cited

U.S. PATENT DOCUMENTS

| | | | |
|---|---|---|---|
| 2,952,129 | 9/1960 | Dempsey | 405/261 |
| 4,497,403 | 2/1985 | Rausch | 405/261 X |
| 4,534,679 | 8/1985 | White et al. | 405/261 |
| 4,534,680 | 8/1985 | White et al. | 405/261 |
| 4,611,954 | 9/1986 | Cassidy | 405/261 |
| 4,861,198 | 8/1989 | Stankus | 405/259 X |

Primary Examiner—Dennis L. Taylor
Assistant Examiner—J. Russell McBee
Attorney, Agent, or Firm—Charles S. McGuire

[57] ABSTRACT

An otherwise conventional mine roof expansion anchor of the bail-type is provided with a tubular retainer member encircling the shell leaves and having an external cross-dimension significantly (e.g., at least 0.10") greater than the diameter of the drill hole in which the anchor is to be installed. Thus, as the anchor, supported on the end of a roof bolt, is advanced into the drill hole in the usual manner, the tubular element is pushed off the anchor by contact with the surface surrounding the drill hole, thereby eliminating the previously required manual removal of the retainer. The tubular retainer has the same cross-sectional configuration in all planes perpendicular to its central axis throughout its full length, preferably being formed as a plastic extrusion.

15 Claims, 2 Drawing Sheets

TUBULAR RETAINER FOR MINE ROOF EXPANSION ANCHOR AND METHOD OF USE

BACKGROUND OF THE INVENTION

The present invention relates to tubular retainer elements which are used to hold mine roof expansion anchors in assembled relation prior to installation in a bore hole, and to methods of using such retainer elements in combination with an expansion anchor. More specifically, the invention relates to novel configurations and methods of use of tubular retainer elements which ensure automatic removal of the retainer element during normal installation of an expansion anchor in a bore hole in a mine roof, or the like.

One of the most common means of reinforcing and supporting mine roofs and other rock structures for many years has been an expansion anchor on a threaded portion of an elongated bolt or rod installed in a preformed bore hole in the rock structure. The expansion anchor includes a tapered nut or camming plug having an internally threaded bore engaged with the threaded portion of the bolt, and an expansible shell portion which is moved radially outwardly into gripping engagement with the wall of the bore hole by axial movement of the camming plug in response to rotation of the bolt.

The expansion shell, in some designs, includes two, or sometimes more, leaf portions which are joined by a strap or bail member having end portions affixed to the leaves and a medial portion extending over the end of the camming plug, which is maintained by the bail in assembled relation with the leaves. Since the bail is normally formed from a strip of somewhat springy sheet metal, the leaf portions may be urged outwardly, away from one another by the biasing force of the bail. While such action is desirable once the assembly is inserted into the bore hole, it is to be avoided prior to such insertion since it may lead to disassembly of the plug and shell. Accordingly, it has been common practice for many years to place a tubular retainer element, normally formed of a suitable plastic, in encircling relation to the shell leaves, thus holding them in the desired, cylindrical configuration.

In order to ensure proper expansion of the shell leaves within the bore hole it is necessary to remove the plastic retainer, preferably just prior to insertion of the assembly into the bore hole. The outside diameter of prior art tubular retainers has conventionally been very close to (e.g., within a few thousandths of an inch) the nominal diameter of the bore hole; thus, manual removal of the retainer has been preferred. Although in most cases bolting crews are instructed to remove the retainer from the expansion shell prior to insertion into the bore hole, errors inevitably occur when relying upon the human element and removal of the retainer is sometimes neglected. The result of the failure to remove the retainer element is often improper expansion of the leaves, causing an incomplete or improper installation of the anchor. In some expansion shell designs, the tubular retainer may be left on as the assembly is placed in the bore hole with the intention that expansion of the leaves will break the retainer. However, in such cases, there is always the possibility of malfunction due to failure of the retainer to break in the manner intended.

Some tubular retainer elements have been formed with an outwardly extending flange at the lower end. Since the cross-sectional configuration of such elements is not uniform throughout their length, they are normally injection molded, thus being more costly to fabricate than an extruded retainer of uniform, unvarying cross section. Therefore, it is desireable to have a retainer which may be economically fabricated as well as automatically removed from encircling relation to the expansion anchor in the course of normal installation.

It is a principal object of the present invention to provide a mine roof expansion anchor including a camming plug, expansion leaves joined by a bail, and a cylindrical retainer element encircling the leaves, wherein the configuration of the retainer element is such that it is automatically removed from encircling relation with the leaves upon insertion of the assembly into a drill hole of predetermined diameter.

Another object is to provide a tubular retainer element of uniform cross-dimension thoroughout its length which is automatically removed from an expansion anchor assembly during normal installation.

A further object is to provide a method of installing an expansion anchor assembly carried on an elongated mine roof bolt or rod into a drill hole of predetermined diameter in a manner which ensures that a cylindrical retainer element which initially encircles the leaf members of the expansion shell is removed as the assembly is installed.

Other objects will in part be obvious and will in part appear hereinafter.

SUMMARY OF THE INVENTION

In accordance with the foregoing objects, the invention contemplates an expansion anchor assembly including a conventional camming plug and expansion leaves joined by a bail, in combination with a cylindrical retainer element of novel design which ensures removal of the retainer from its initially encircling relation to the leaves upon insertion of the anchor into a bore hole of predetermined diameter. The retainer element, preferably formed as a plastic extrusion cut to a desired length, is disclosed in a number of embodiments, each having a uniform cross-sectional configuration along its entire length. Anchor assemblies are designed for use in drill holes of predetermined nominal diameter, e.g., 1¼", 1⅜", etc. The expansion leaves, in their normally assembled condition prior to installation, have a maximum, external, cross-dimension which is commonly a few thousandths of an inch less than the nominal drill hole diameter.

The tubular retainer elements of the invention are designed with a uniform cross-sectional configuration having surfaces defining a minimum inside cross-dimension substantially equal to the maximum external cross-dimension of the unexpanded leaf assembly, and a maximum outside cross-dimension significantly greater (e.g., at least 1/10") than the nominal diameter of the bore hole wherein the anchor assembly is to be installed. Disclosed embodiments include retainer elements having a cylindrical body portion of uniform thickness and a plurality of ribs extending from either the outer or inner surface, or both, and running longitudinally for the full length of the body portion. In the currently preferred embodiment, the retainer element comprises two, spaced, concentric, cylindrical walls joined by integral, radially extending ribs.

The normal manner of installation of such prior art mechanical expansion anchors in a preformed bore hole involves threading the camming plug on the end of the roof bolt opposite the headed end which carries a bearing plate and washer. The tubular retainer element which encircles the shell leaves is manually removed, and the bolt is advanced into the hole manually, or by a pneumatic or hydraulic bolting machine engaged with the headed end of the bolt, until the bearing plate firmly contacts the rock surface surrounding the open end of the bore hole. The bolting machine then rotates the bolt, causing the camming plug to travel axially and expand the shell leaves, whereupon the bolt may be tensioned to a desired degree.

The assembly of the present invention is installed in like manner, except that manual removal of the retainer element is unnecessary. Instead, the upper end of the retainer element contacts the rock formation surrounding the bore hole, due to the cross-dimension of the retainer being larger than the bore hole diameter. Thus, as the bolt is advanced into the hole, the retainer is pushed off the shell leaves, remaining in encircling relation with the bolt, and is crushed between the bearing plate and the rock surface with no adverse effects to the anchoring installation. In some cases the bore hole may be oversized at or near its open end, i.e., at the start of drill penetration. In such cases, the upper end of the retainer element may enter the bore hole for a short distance, but the retainer is, in any event, pushed off the expansion leaves as the anchor is advanced into the hole.

The foregoing and other features of the invention will be more readily understood and appreciated from the following detailed description, taken with the accompanying drawings, wherein:

DETAILED DESCRIPTION

Figure 1:
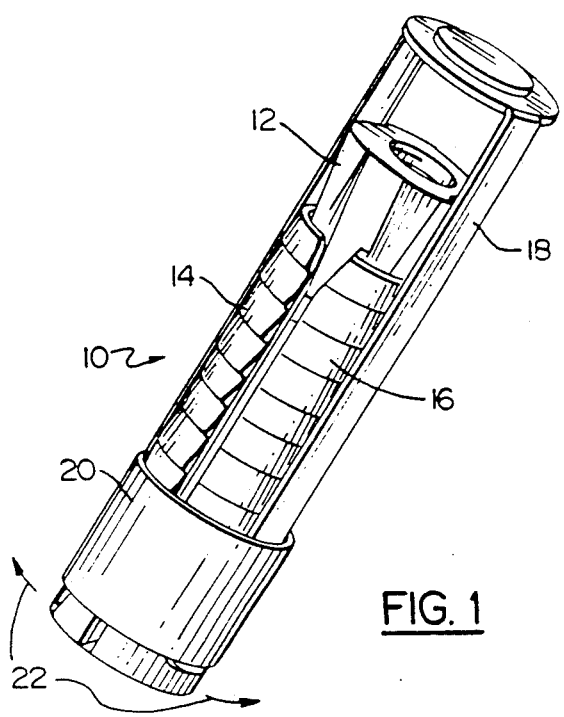
FIG. 1 is a perspective view of a typical mine roof expansion anchor assembly including a prior art retainer element.

Referring now to the drawings, in FIG. 1 is seen an expansion anchor assembly 10 of a type commonly used in reinforcing and supporting mine roofs and other rock formations. Anchor 10 includes tapered nut or camming plug 12 and a pair of expansion leaves 14 and 16, joined by bail 18 having end portions permanently secured to the respective leaves and a medial portion extending over camming plug 12. The plug, leaves and bail are of conventional design, and may take a number of forms, many of which are presently in commercial use. Anchor 10 is designed for installation in a bore hole of predetermined nominal diameter in a rock formation.

A retainer element, denoted generally by reference numeral 20, encircles leaves 1 and 16. Retainer 20 is a tubular, relatively thin-walled sleeve, commonly formed as a plastic extrusion, the material and thickness being such that the element is readily flexible by manual pressure, but resumes its cylindrical configuration upon removal of the pressure. Retainer 20 is slipped over leaves 14 and 16 after camming plug 12 has been positioned with its larger diameter end under the medial portion of the bail, and its smaller diameter end extending into the space between the upper ends of the leaves. The material, thickness and configuration of bail 18 are such that the bail legs exert an outwardly biasing force on leaves 14 and 16, tending to move them away from one another, as indicated by arrows 22. Thus, retainer 20 is frictionally held in position by the outward force, which may be only a few ounces, of leaves 14 and 16.

As previously mentioned, anchor assembly 10, including retainer 20, is of a typical, prior art design. In a typical commercial embodiment of such assemblies designed for use in a bore hole having a nominal diameter of 1.250", the inside diameter of retainer 20 (equalling the maximum, outside diameter of the assembled configuration of leaves 14 and 16) has been 1.217" and the outer diameter 1.267". In anchor assemblies for use in nominal 1.375" diameter bore holes, the inside and outside diameters of retainer 20 have typically been 1.320" and 1.370", respectively. In other anchor assemblies, the differences between the nominal bore hole diameter and the inside and outside diameters of the plastic sleeve or retainer have been comparable to the above. That is, the inside diameter of the retainer and corresponding maximum cross-dimension of the anchor is a few thousandths of an inch (0.033" and 0.055" in the above examples) less than the nominal diameter of the bore hole. The outside diameter, or maximum external cross-dimension of the retainer has been either a few thousandths of an inch (0.017" in the 1.250 diameter bore hole) greater or a few thousandths of an inch (0.005 in the 1.375 diameter bore hole) smaller than the nominal bore hole diameter. The few thousandths greater diameter is insufficient to ensure retainer removal, particularly when the bore hole is slightly oversize.

Figure 2A:
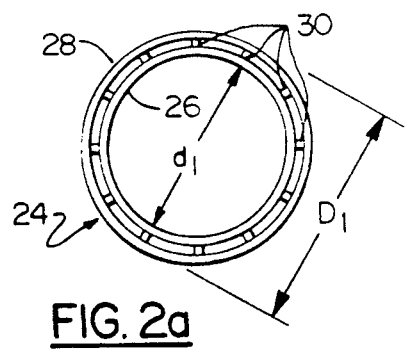
FIGS. 2a and 2b are plan and perspective views, respectively, of a first embodiment of the retainer element of the present invention.
Figure 2B:
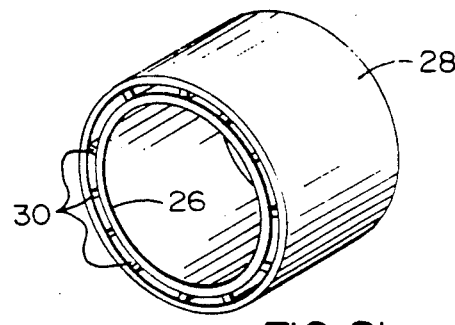

A retainer element for use in the present invention is shown in a first, preferred embodiment in FIGS. 2a and 2b, denoted generally by reference numeral 24. Retainer 24 may be fabricated of the same material as conventional retainer 20, also preferably as a plastic extrusion. Thus, retainer 24 has a uniform cross-sectional configuration throughout its axial length which may be, for example, $\frac{1}{2}$" to 1". Retainer 24 includes internal and external, thin-walled cylindrical bodies 26 and 28, respectively, held in spaced concentric relation by a plurality of ribs 29, integral to both the inner and outer, cylindrical bodies. Inner cylindrical body 26 has an inside diameter, constituting the minimum, internal cross-dimension of retainer 24, of $d_1$. Dimension $d_1$ corresponds to the maximum, external cross-dimension of the anchor assembly with which retainer 24 is to be used. Outer cylindrical body 28 has an outside diameter, constituting the maximum, external cross-dimension of retainer 24, indicated by dimension $D_1$.

Figure 3:
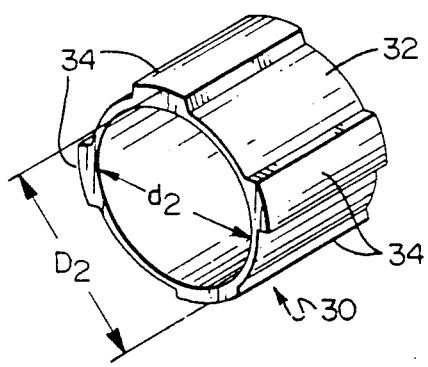
FIGS. 3, 4, 5, and 6 are perspective views of further embodiments of the retainer element.

Retainer 30 of FIG. 3 comprises cylindrical body 32 having four ribs 34 extending outwardly from its outer surface. The number and/or width of ribs 34 may be varied as desired, although it is essential that the material and dimensions be such that the ribs remain axially rigid, at least under an axial force of several pounds. The minimum internal and maximum external cross-dimensions of retainer 30 are indicated by dimensions $d_2$ and $D_2$, respectively.

Figure 4:
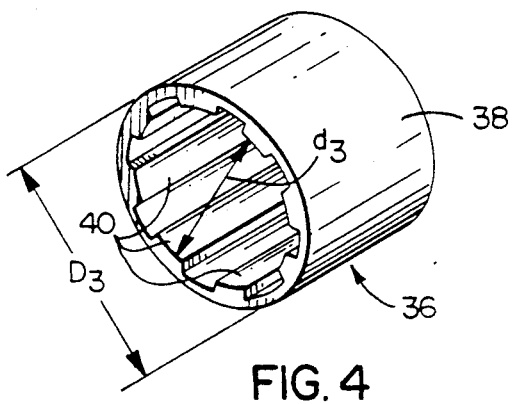
Figure 5:
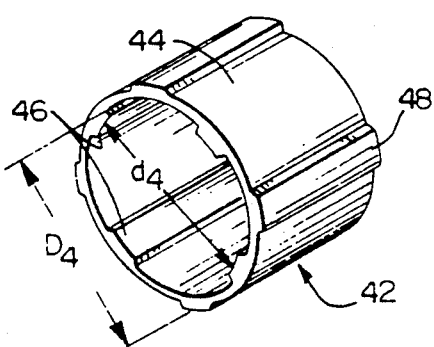

A further embodiment of the retainer, denoted by reference numeral 36, is shown in FIG. 4. Retainer 36 includes cylindrical body 38 with a plurality of ribs 40 extending inwardly from the internal surface thereof. The minimum internal and maximum external cross-dimensions of retainer are indicated by dimensions $d_3$ and $D_3$, respectively. Retainer 42 of FIG. 5 comprises cylindrical body 44 having pluralities of both internal ribs 46 and external ribs 48, providing minimum internal and maximum external cross-dimensions of $d_4$ and $D_4$, respectively.

Figure 6:
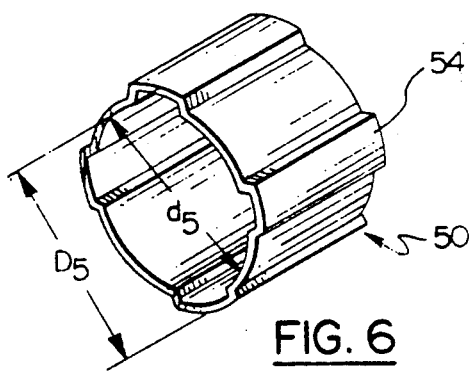

Retainers 30, 36 and 42 each have a cylindrical body of uniform thickness and a plurality of ribs extending either outwardly, inwardly, or both, from the walls of the body, whereby the overall wall thickness of the retainer is greater in the areas of the ribs. In FIG. 6 is shown retainer 50, having a uniform wall thickness about its entire periphery and throughout its length. Retainer 50 includes wall portions 52, forming arcs of a cylinder, joined by three-sided wall portions 54. Thus, wall portions 54 serve to increase the maximum external cross-dimension of retainer 50 beyond the outside diameter of the cylinder of which wall portions 52 form arcs, without increasing the wall thickness of the retainer. The minimum internal and maximum external cross-dimensions of retainer 50 are indicated at $d_5$ and $D_5$, respectively. It should be kept in mind that the material and thickness of retainer 50 must be sufficient to hold the leaves surrounded by the retainer in the desired relation, without permitting the biasing force of the bail to move the leaves outwardly by flexing or distorting the walls of retainer 50.

The minimum internal cross-dimension of the retainer, in all embodiments, is the same as the maximum cross-dimension of the anchor leaves, in their assembled relation prior to installation, which are surrounded and maintained in the desired relationship by the retainer. As previously mentioned, this is commonly a few thousandths of an inch less that the bore hole in which the anchor is designed to be installed. The maximum external cross-dimension of retainers 24, 30, 36 and 42 and 50 is significantly greater. e.g., at least 0.10" and preferably at least 0.15", than the diameter of the bore hole. This dimensional relationship ensures automatic removal of the retainer from its encircling relation to the leaves of the expansion anchor, eliminating the requirement for manual removal, as explained in more detail in connection with FIGS. 7-9.

Although some prior art, cylindrical retainers had outside diameters several thousandths of an inch greater than the nominal bore hole diameter, this was neither intended nor dimensionally sufficient to ensure that the retainer would be removed from the anchor assembly by insertion thereof into the bore hole. Some tolerance is always present in the drilling of bore holes for rock support installations, and a slightly oversized bore hole would fail to remove a retainer having an outside cross-dimension only slightly larger than the nominal bore hole diameter. Therefore, manual removal of the retainer has always been a required, although sometimes neglected, step in the installation procedure.

Figures 7, 8, 9:
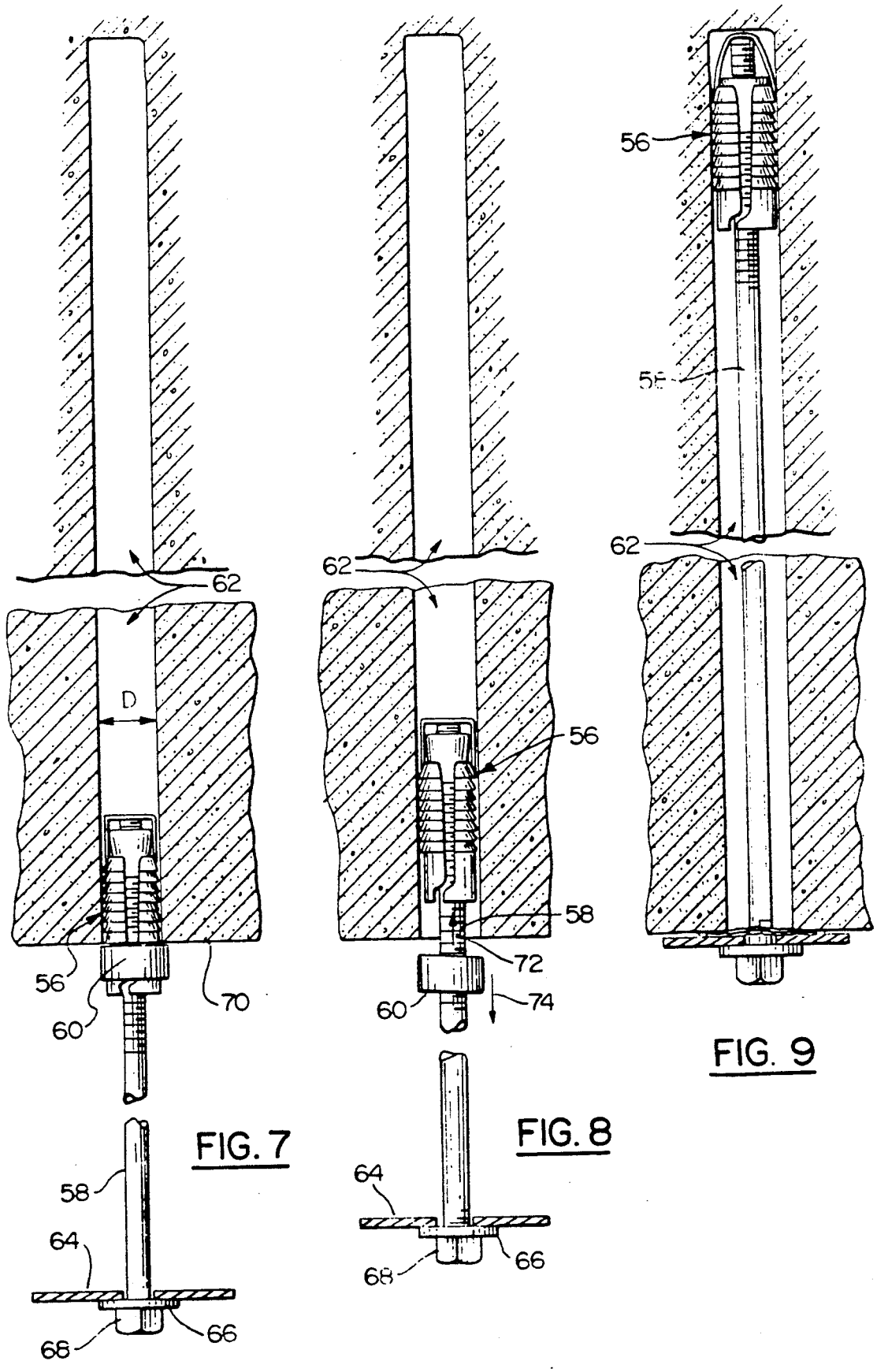
FIGS. 7-9 are elevational views of the expansion anchor assembly of the present invention, in combination with a roof bolt and bearing plate, illustrating the manner of installation thereof in a bore hole in a rock formation, the latter being shown in vertical section.

Referring now to FIGS. 7-9, expansion anchor assembly 56 is placed on the end of roof bolt 58 by threading an end portion of the bolt into the internally threaded bore of the anchor camming plug. As previously explained, the two shell halves are connected by the bail and maintained in assembled relation by a tubular element denoted by reference numeral 60. Element 60 may be any of elements 24, 30, 36, 42 or 50, or equivalent tubular structure having a minimum internal cross-dimension not greater than D, the diameter of drill hole 62 wherein the expansion anchor is to be installed, and a maximum external cross-dimension significantly (i.e., at least 0.10") greater than D. Bolt 58 passes through an opening in bearing plate 64 with hardened washer 66 placed between the plate and bolt head 68.

The elements are shown in FIG. 7 with the upper or forward portions of bolt 58 and anchor assembly 56 inside drill hole 62, and the upper edge of tubular element 60 contacting the portion of rock formation surface 70 which surrounds the open end of the drill hole. As bolt 58 is advanced into drill hole 62, as indicated by arrow 72 in FIG. 8, tubular element 60 is pushed off anchor 56. Element 60 is then unsupported, although still encircling bolt 58, and may drop down the bolt, as indicated by arrow 74, to rest upon bearing plate 64. Continued advancement of bolt 58 to urge bearing plate 64 into contact with rock surface 70, and rotation of the bolt to cause expansion of the anchor and tensioning of the bolt, crushes tubular element 60 between plate 64 and rock surface 70, as shown in FIG. 9.

Thus, the bolt, bearing plate and expansion anchor are installed in the usual manner without the necessity of manual removal of the tubular element which initially maintains the expansion leaves in the desired relation. The tubular element, which is the only portion of the illustrated structure which is not conventional, is automatically removed as the bolt and anchor are advanced into the drill hole.

What is claimed is:

1. A mine roof support system comprising:
 a) a rock formation having a surface and a bore hole extending into said formation from an open end of predetermined diameter surrounded by a portion of said surface;
 b) an elongated bolt externally threaded from one end for at least a portion of its length;
 c) at least two, structurally separate, expansion leaves having upper and lower ends, and first inner and outer surfaces;
 d) a substantially U-shaped bail having a plurality of flexible legs extending from a medial portion, each of said legs being fixedly attached to a respective one of said leaves with said medial portion positioned above and in spaced relation to said upper ends of said leaves, said bail holding said leaves in assembled relation with one another;
 e) a tapered camming plug having a smaller diameter end contacting said first inner surfaces adjacent said upper ends of said expansion leaves, a larger diameter end positioned under said bail medial portion, and a central, internally threaded bore extending between said larger and smaller diameter ends and threadedly engaged with said one end of said bolt for insertion of said leaves, bail and plug into said bore hole with said one end of said bolt; and
 f) a tubular member open at both ends, having second inner and outer surfaces, a central axis and a uniform cross section in all planes perpendicular to said axis, said tubular member encircling said expansion leaves adjacent said lower ends thereof with said second inner surface contacting said first outer surfaces, said second inner surface having a minimum cross dimension not greater than said predetermined diameter, whereby said tubular member retains said leaves in a configuration small enough for advancement into said bore hole with said one end of said bolt, and said second outer surface having a maximum cross dimension at least 0.10" greater than said predetermined diameter, thereby preventing axial insertion of said tubular member into said drill hole and causing removal of said tubular member from encircling relation to said leaves by contact of said member with said portion of said surface as said one end of said bolt, with said leaves, bail and plug thereon, is advanced into said bore hole.

2. The expansion anchor assembly of claim 1 wherein the number of said leaves is two.

3. The expansion anchor assembly of claim 1 wherein said tubular member is a plastic extrusion.

4. The expansion anchor assembly of claim 3 wherein said second inner and outer surfaces are cylindrical.

5. The expansion anchor assembly of claim 4 wherein said tubular member comprises a pair of concentric spaced, cylindrical body portions joined by a plurality of ribs extending between and integral to both of said body portions.

6. The expansion anchor assembly of claim 4 wherein said tubular member comprises a cylindrical body portion and a plurality of ribs extending integrally from at least one of said second inner and outer surfaces for the full axial length of said tubular member.

7. The expansion anchor assembly of claim 6 wherein said ribs extend integrally from both of said second inner and outer surfaces.

8. A retainer element for temporarily securing expansion leaves of a bail-type mine roof expansion anchor in an orientation wherein said leaves have a maximum external cross-dimension closely approximating but not larger than the predetermined diameter of a drill hole in a rock formation wherein said anchor is designed for installation, said retainer element comprising a tubular member of generally cylindrical configuration, open at both ends, having a central axis and uniform cross section in all planes perpendicular to said axis, said tubular member comprising a pair of concentrically spaced, inner and outer cylindrical body portions joined by a plurality of ribs extending between and integral to both of said body portions, said inner portion having a minimum internal cross-dimension equal to said maximum external cross-dimension of said leaves, and said outer body portion having a maximum external cross-dimension at least 0.10" larger than said predetermined diameter.

9. The retainer element of claim 8 wherein said tubular member is a plastic extrusion.

10. The retainer element of claim 9 wherein said tubular member includes cylindrical inner and outer surfaces.

11. A retainer element for temporarily securing expansion leaves of a bail-type mine roof expansion anchor in an orientation wherein said leaves have a maximum external cross-dimension closely approximately but not larger than the predetermined diameter of a drill hole in a rock formation wherein said anchor is designed for installation, said retainer element comprising a tubular member of generally cylindrical configuration, open at both ends, having a central axis and uniform cross section in all planes perpendicular to said axis, said tubular member comprising a cylindrical body portion and a plurality of ribs extending integrally from at least one of said inner and outer surfaces and circumferentially spaced about said body portion for the full axial length of said tubular member, and having a minimum internal cross-dimension equal to said maximum external cross-dimension of said leaves, and a maximum external cross-dimension at least 0.10" larger than said predetermined diameter.

12. The retainer element of claim 11 wherein said ribs extend integrally from both of said second inner and outer surfaces.

13. A method of installing in a mine roof, or the like, a mine roof bolt having a threaded portion extending from one end and carrying thereon a mechanical expansion having at least two expansion leaves, a bail having end portions respectively joined to each of said leaves, and a tapered camming plug having an internally threaded, axial bore threadedly engaged with said bolt end portion, said method comprising:

a) drilling a blind bore hole of predetermined diameter extending into said mine roof from an opened end surrounded by a portion of said mine roof surface;

b) forming a generally cylindrical, tubular member, open at both ends, having inner and outer surfaces, a central axis, a uniform cross section in all planes perpendicular to said axis, a minimum internal cross dimension not greater than said predetermined diameter and a maximum external cross dimension at least 0.010 greater than said predetermined diameter;

c) placing said tubular member in encircling relation to said leaves with a leading end of said tubular member closer to said bolt one end, said leaves contacting said tubular member inner surface and thus retained with a maximum cross dimension not greater than said predetermined diameter;

d) advancing said one end of said bolt into said bore hole to bring said leading end of said tubular member into contact with said portion of said mine roof surface;

e) continuing to advance said one end of said bolt into said bore hole, pushing said leaves through said tubular member and disengaging said tubular member from said leaves as the latter enter said bore hole; and f) rotating said bolt to expand said leaves into gripping engagement with said bore hole and tensioning said bolt.

14. The method of claim 13 wherein said tubular member is preformed as a plastic extrusion.

15. The method of claim 14 wherein said tubular member comprises a pair of cylindrical body portions, held in radially spaced, concentric relation by a plurality of ribs extending integrally between said body portions.

* * * * *